United States Patent
Kikuchi et al.

(10) Patent No.: US 9,505,932 B2
(45) Date of Patent: Nov. 29, 2016

(54) SYNTHETIC WOOD MEAL

(71) Applicant: WPC Corporation, Tokyo (JP)

(72) Inventors: Takeyasu Kikuchi, Tokyo (JP); Kazumasa Morita, Tokyo (JP); Yuichiro Nakamura, Tokyo (JP); Koji Higashi, Tokyo (JP)

(73) Assignee: BEIJING SHENGSHENG CULTURE LIMITED LIABILITY COMPANY, Beijing (CN)

( * ) Notice: Subject to any disclaimer, the term of this patent is extended or adjusted under 35 U.S.C. 154(b) by 40 days.

(21) Appl. No.: 14/366,718

(22) PCT Filed: Dec. 12, 2012

(86) PCT No.: PCT/JP2012/082189
§ 371 (c)(1),
(2) Date: Jun. 19, 2014

(87) PCT Pub. No.: WO2013/094490
PCT Pub. Date: Jun. 27, 2013

(65) Prior Publication Data
US 2014/0350143 A1 Nov. 27, 2014

(30) Foreign Application Priority Data
Dec. 20, 2011 (JP) .................................. 2011-278357

(51) Int. Cl.
*C08L 97/02* (2006.01)
*B29B 9/14* (2006.01)
(Continued)

(52) U.S. Cl.
CPC .................. *C08L 97/02* (2013.01); *B29B 9/14* (2013.01); *B29C 47/1027* (2013.01);
(Continued)

(58) Field of Classification Search
CPC ........ C08L 97/02; C08L 23/04; C08L 23/10; C08L 1/00; C08L 23/02; C08L 2205/16; C08L 2207/20; B29B 9/14; B29C 47/1027; B29C 47/92; B29C 47/0004; B29C 47/0019; B29C 47/0028; B29C 47/003; B29C 47/40; B29C 2947/92704; C08K 3/22; C08K 7/02

USPC ............................................................ 524/38
See application file for complete search history.

(56) References Cited

U.S. PATENT DOCUMENTS 4,228,116 A * 10/1980 Colombo ............... A01D 34/30
264/119
5,574,094 A * 11/1996 Malucelli ................ C08L 23/02
524/13
(Continued)

FOREIGN PATENT DOCUMENTS

CA 2796753 A1 11/2011
EP 0284058 A2 9/1988
(Continued)

OTHER PUBLICATIONS

European Search Report, Appl No. 12860283, dated Apr. 23, 2015, 5 pages.

*Primary Examiner* — Susannah Chung
*Assistant Examiner* — Josephine Chang
(74) *Attorney, Agent, or Firm* — Cooper Legal Group, LLC

(57) ABSTRACT

A synthetic wood meal for a pellet that enables to manufacture a molded product with no deformation such as warping and distortion or, if any, deformation that can be alleviated to a practically non-problematic level and also features high mechanical strength. The synthetic wood meal comprises 30 wt % to less than 45 wt % of a thermoplastic resin including polypropylene or a mixed material of polypropylene and polyethylene; 50 wt % to 35 wt % of a wood meal having a bulk density of 0.15 to 0.21 g/cm$^3$ and a mean fiber length of 101 to 189 μm in which 19 to 29% or less of the wood meal having a shortest fiber length of 60 μm or less, and 9 to 20% or less of the wood meal having a shortest fiber length of 30 μm or less; and an additive including a reinforcing agent.

7 Claims, 9 Drawing Sheets

(51) Int. Cl.
  *C08L 23/04* (2006.01)
  *C08L 23/10* (2006.01)
  *B29C 47/10* (2006.01)
  *B29C 47/92* (2006.01)
  *C08K 3/22* (2006.01)
  *C08K 3/26* (2006.01)
  *C08L 1/00* (2006.01)
  *C08L 23/02* (2006.01)
  *B29C 47/00* (2006.01)
  *B29C 47/40* (2006.01)
  *C08K 7/02* (2006.01)

(52) U.S. Cl.
  CPC .............. *B29C 47/92* (2013.01); *C08L 23/04* (2013.01); *C08L 23/10* (2013.01); *B29C 47/003* (2013.01); *B29C 47/0004* (2013.01); *B29C 47/0019* (2013.01); *B29C 47/0028* (2013.01); *B29C 47/40* (2013.01); *B29C 2947/92704* (2013.01); *C08K 3/22* (2013.01); *C08K 3/26* (2013.01); *C08K 7/02* (2013.01); *C08L 1/00* (2013.01); *C08L 23/02* (2013.01); *C08L 2205/16* (2013.01); *C08L 2207/20* (2013.01)

(56) References Cited

U.S. PATENT DOCUMENTS

2010/0004358 A1   1/2010   Hashiba
2012/0088853 A1*  4/2012   Kikuchi ................. B29C 44/12
                                                           521/84.1

FOREIGN PATENT DOCUMENTS

| | | |
|---|---|---|
| EP | 2298532 A1 | 3/2011 |
| JP | 08103934 | 4/1996 |
| JP | 11070508 | 3/1999 |
| JP | 2002003723 | 1/2002 |
| JP | 2004019353 | 1/2004 |
| JP | 2010137480 | 6/2010 |
| JP | 2011062936 | 3/2011 |
| WO | 2011001745 A1 | 1/2011 |

* cited by examiner

Schematic diagram of bending test

Melt fracture phenomenon

SYNTHETIC WOOD MEAL

FIELD OF THE INVENTION

The present invention relates to synthetic wood meal as a raw material of synthetic wood boards in the form of synthetic molded products composed of resin and wood meal and relates particularly to synthetic wood meal extruded into a molded product that not only exhibits high weatherability but also features no deformation, such as warping and distortion, or, if any, deformation that can be alleviated to a practically non-problematic level.

DESCRIPTION OF THE RELATED ART

When a synthetic wood board is to be manufactured, the resulting molded product tends to suffer from deformation, such as warping and distortion, and particularly if the molding material contains a large amount of filler such as wood meal, pulp, or talc that reduces the fluidity of the material, the product has an even greater tendency to suffer from this kind of deformation.

Deformation as described above more easily takes place with an elongated molded product such as a board, and the thicker the board, the more noticeable such deformation.

This kind of deformation appears more severe in the form of warping as the molded product repeatedly expands and contracts due to changes in weather over time.

For this reason, it is difficult to manufacture an elongated and relatively thick product such as a synthetic wood board by using an extrusion apparatus, if the product contains a large amount of filler such as wood meal as described above. Manufacturing such a product via extrusion requires elimination of the warping or distortion of the molded product, and this straightening work adds to the manufacturing process, making the product costly.

Furthermore, even if deformation of the molded product is eliminated in this manner, not only may the straightened molded product suffer from warping or distortion again over time depending on the use conditions, but also the resultant molded product will have low mechanical strength. Therefore, there is a demand for manufacturing a molded product that averts deformation such as warping and distortion as described above and also features high mechanical strength.

Japanese Unexamined Patent Application Publication No. 2010-137480 describes that a thermoplastic resin is mixed with wood meal and a crosslinking agent for crosslinking the ingredients, thereby coupling more molecular chains of the thermoplastic resin and accordingly enhancing the coupling of the thermoplastic resin and that, as a result of enhancement of the coupling between molecular chains of the thermoplastic resin surrounding the wood meal, expansion of the wood meal due to moisture absorption is suppressed, thus reducing the water absorbency of the synthetic wood board. Japanese Unexamined Patent Application Publication No. 2004-19353 describes that the aforementioned problem is solved based on the structure for attaching the deck material. Japanese Unexamined Patent Application Publication No. 2011-62936 describes that the aforementioned problem is solved through research and development of the molding die.

Related Art References of the present invention are described below.

DOCUMENT OF RELATED ART

Patent Documents

Patent Document 1: Japanese Unexamined Patent Application Publication No. 2011-62936

DISCLOSURE OF THE INVENTION

Problem to be Solved by the Invention

In contrast with the technology disclosed in the above-described related art reference, the present invention is intended to solve the aforementioned problem by developing synthetic wood meal itself as a raw material, and an object thereof is to provide synthetic wood meal that can be made into a molded product that not only exhibits high weatherability but also features no deformation such as warping and distortion or, if any, deformation that can be alleviated to a practically non-problematic level, thus eliminating the need to perform straightening work after extrusion and ensuring high mechanical strength.

Means for Solving the Problems

Means for solving the problems will be described below with reference to embodiments of the invention. It is to be noted that the following descriptions are only provided for clarifying the correspondence relationship between the scope of the claims and the embodiments of the invention, but should not be used for limiting the interpretation of the technical scope of the claims of the present invention.

A synthetic wood meal for a pellet used for extrusion molding of a molded wood product according to the present invention comprises:

30 wt % to 70 wt % of a thermoplastic resin including polypropylene (PP) or a mixed material of polypropylene (PP) and polyethylene (PE) or polyvinyl chloride (PVC);

70 wt % to 30 wt % of a wood meal having a bulk density of 0.14 to 0.22 g/cm$^3$ and a mean fiber length of 80 to 250 µm in which 30 wt % or less of the wood meal having a shortest fiber length of 60 µm or less, and 25 wt % or less of the wood meal having a shortest fiber length of 30 µm or less; and an additive including a reinforcing agent.

Preferably, 5 wt % or less of the wood meal has a longest fiber length of 450 µm to 800 µm.

Preferably, the water content of the wood meal is 5 to 10 wt %.

Furthermore, the compounding ratio of the wood meal to the thermoplastic resin including polypropylene and/or polyethylene may be 50 wt % of wood meal to 34.5 wt % of thermoplastic resin, and the remainder may include additives including a reinforcing agent such as a talc as a nonorganic filler, and a compatibilizer or the like.

In the case that polyvinyl chloride is used as the thermoplastic resin, the compounding ratio of the wood meal to the thermoplastic resin may be 48 wt % of the wood meal to 35 wt % of the thermoplastic resin, and the remainder may include additives such as a heat stabilizer, a lubricant, a compatibilizer, and calcium hydroxide or calcium carbonate as a reinforcing agent.

The polypropylene may be OGPP or a recycled PP which is a resin collected in accordance with the Containers/

Packaging Recycling Act and contains polypropylene (PP) and polyethylene (PE) in a ratio of PP:PE≈1:1 by DSC (differential scanning calorimetry) analysis (hereinafter referred to as PP1) or recycled PP containing the recycled PP1 and OGPP in a ratio of the recycled PP1 (50%):OGPP (50%)=1:1, namely containing approximately 25 wt % of PE (hereinafter referred to as PP2).

In the case that polyvinyl chloride (PVC) is used as the thermoplastic resin, it is preferable to use a modified PVC copolymer as the compatibilizer. Especially, as the modified PVC copolymer, the one prepared by polymerizing allyl glycidyl ether, vinyl chloride, and vinyl acetate is preferable.

Effects of the Invention

With the above-described composition, the molding process is stabilized, the mechanical strengths (bending strength, bending elastic modulus) and the durability of the molded product become superior, and the thermal expansion/contraction characteristic (linear expansion coefficient) is considerably improved, thereby making it possible to manufacture a molded product with physical properties similar to those of natural wood. Therefore, wider practical applications and use environments (regions suffering large changes in temperature) of the molded product can be expected.

When polyvinyl chloride (PVC) is used as the thermoplastic resin, foaming due to hydrogen chloride gas resulting from the polyvinyl chloride during melt-knead processing is prevented by adding calcium carbonate or calcium hydroxide as a reinforcing agent. In addition, when synthetic wood using PVC according to the present invention is to be disposed of by incineration, the generation of dioxin and poisonous hydrogen chloride gas, which causes the incinerator to corrode, can be prevented.

Furthermore, when polyvinyl chloride (PVC) is used as the thermoplastic resin, a modified PVC copolymer, added as the compatibilizer, which is produced by polymerizing allyl glycidyl ether, vinyl chloride, and vinyl acetate, not only works as a stabilizer while the PVC is being melted but also prevents generation of dioxin and poisonous hydrogen chloride gas, which causes the incinerator to corrode when synthetic wood using PVC according to the present invention is to be disposed of by incineration.

BEST MODE FOR CARRYING OUT THE INVENTION

Figure 1:
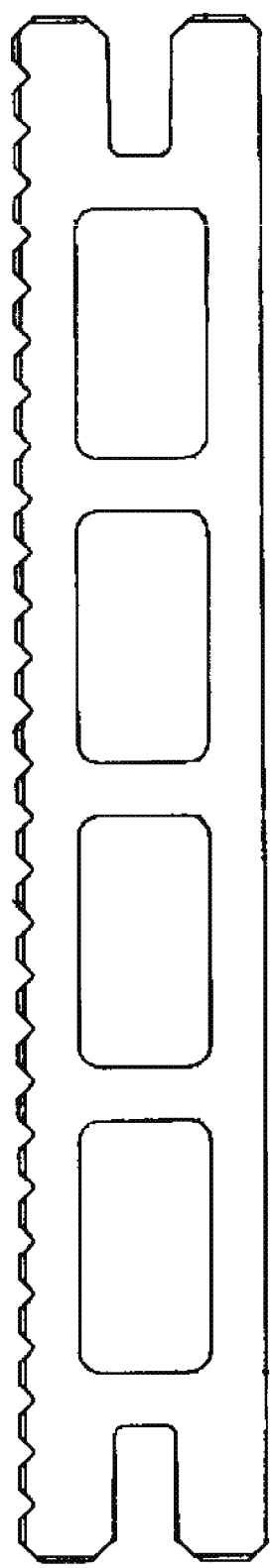
FIG. 1 shows one example of a synthetic wood board manufactured according to one embodiment of the present invention.

Tables 1 and 2 show Compound 1 in which PP is used as the resin as a basic ingredient of the invention, and Compound 2 in which PVC is used as the resin, along with target physical properties of a synthetic wood board manufactured based on Compounds 1 and 2.

TABLE 1

Basic Ingredients and Target Physical Properties

| Example of Compound | Raw Material | | Compounding Ratio (wt %) | Remarks |
|---|---|---|---|---|
| Compound 1 (polyolefin-based) | polyolefin-based resin (PP, PP + PE *1, or PP + PE *2) | | 34.5 | Virgin PP (SUN AROMA CO., LTD. PL-400: MI 2) OGPP (Japan Polypropylene Corporation P-102: MI 2) *1 Recycled PP1 (Industrial waste: Recycled film: MI: 2 to 5) Recycled PP2: Containers/Packaging Recycling Act (Refer to Table 2: MI 2 to 5) *2, |
| | Wood meal | | 50.0 | Composition: Examples 1 to 4 and Comparative Examples 1 to 9 *3 |
| | Talc | | 15.0 | Fuji Talc Industrial Co., Ltd. SP-40 (mean grain diameter of 23 µm) |
| | Reinforcing agent | Compatibilizer | 0.5 | Sanyo Chemical Industries, Ltd. "Yumex 1010" (maleic anhydride modified olefin compound) |
| Compound 2 (PVC) | | PVC1 | 20.0 | Rigid PVC (Mitsubishi Plastics Inc.) 20 wt % (virgin) |
| | PVC1 and 2 mixed | PVC2 | 15.0 | Flexible PVC (Kochi Vinyl: Collected agricultural waste film) |
| | Wood meal | | 48.0 | Example 5 (1) and Comparative Example 10 (5) |
| | Reinforcing agent; calcium carbonate | | 15.0 | SHIRAISHI CALCIUM KAISHA LTD. BF200 |

TABLE 1-continued

Basic Ingredients and Target Physical Properties

| Example of Compound | Raw Material | Compounding Ratio (wt %) | Remarks |
|---|---|---|---|
| | Heat stabilizer | 1.0 | SAKAI CHEMICAL INDUSTRY CO., LTD. LHR376K |
| | Lubricant | 1.0 | SAKAI CHEMICAL INDUSTRY CO., LTD. LBT702 + 704 + 750 + 671 mixed |

*1 Although OGPP is a nonstandard (off-grade) product with an MI value of 2 to 5, it is almost the same as virgin PP. Recycled PP1 represents a resin collected in accordance with the Containers/Packaging Recycling Act, provided that the resin is composed of PP and PE at a ratio of PP:PE ≈ 1:1 by DSC (differential scanning calorimetry) analysis. In Tables 3 and 5, these types of resin are generally referred to as PP.
MI: Melt index
* 2Recycled PP2 represents a resin containing 50% recycled PP1 (50 wt %) and 50% OGPP (50 wt %), or at a ratio of 1:1, namely containing approximately 25 wt % of PE.

TABLE 2

Target Physical Properties *3
Target physical properties (physical properties of synthetic wood board approximated to those of natural wood)

| Basic physical properties required for synthetic wood board | Bending strength | (MPa) | | 25 <≈ 80 | Lumber from thinning *4 25 to 80 |
|---|---|---|---|---|---|
| | Bending elastic modulus | (MPa) | | 4000 <≈ 10,000 | 4000 to 10000 |
| | Linear expansion coefficient | M (extrusion) direction | | 4.0 <≈ 0.15 | 0.15 to 0.25 |
| | | T (orthogonal to the extrusion direction) direction | | (Reference; ≤11.0) | 1.5 to 4.5 |

*3 Target physical properties are based on the physical properties of natural wood (lumber from thinning) presented as reference data.
*4 The physical properties of lumber from thinning are used as indices for approximating the physical properties of the molded product according to the present invention to the basic physical properties (particularly, mechanical strength and linear expansion coefficient correlated with the thermal expansion/contraction) of natural wood.

A method for measuring physical properties will be described later.

Among the target physical properties, the T direction has no target value setting. This is because the length in the direction (width direction) orthogonal to the extrusion direction has a reference value of 145 mm, or 200 mm at most, which causes hardly any problem irrespective of the magnitude of the linear expansion.

Examples and Comparative Examples of the compound are shown in Tables 3 and 4 below.

TABLE 3

Compounding Ratio and Wood Meal Composition of PP-compounded Examples and Comparative Examples

| | Mixing Ratio | | | | | | | Wood Meal Composition | | | | | |
|---|---|---|---|---|---|---|---|---|---|---|---|---|---|
| | PP | | | Wood Meal Resin/ Wood Meal Com- pounding Ratio | Talc | Rein- forc- ing Agent | Re- marks Exam- ple | Mean Fiber Length | Shortest Fiber Length (%) | Longest Fiber Length (%) | Bulk Den- sity | Water Content | Re- marks Exam- ple |
| | | 84.50% | | | | | | | Target Values | | | | |
| | OGPP | Re- cy- cled PP1 | Re- cy- cled PP2 | | | | | μm 80 to 250 | μm ≤60 ≤30% | μm ≤30 ≤25% | μm 450 to 800 ≤5% | cm^3) 0.14 to 0.22 | (wt %) 5 to 10 | |
| Example 1 | 34.5 | | | 50 | 40.8/59.2 | 15 | 0.5 | EX1 | 101 | 29 | 17 | 1.4 | 0.15 | 5.5 | EX1 |
| Example 2 | | 34.5 | | 50 | | 15 | 0.5 | EX2 | 120 | 25 | 20 | 4.0 | 0.19 | 6.0 | EX2 |
| Example 3 | | 34.5 | | 50 | | 15 | 0.5 | EX3 | 189 | 23 | 12 | 5.0 | 0.21 | 8.0 | EX3 |
| Example 4 | | | 34.5 | 50 | | 15 | 0.5 | EX4 | 147 | 19 | 9 | 4.0 | 0.17 | 10.0 | EX4 |
| Comparative Example 1 | 34.5 | | | 50 | | 15 | 0.5 | CE1 | 75 | 60 | 40 | 0.2 | 0.13 | 10.0 | CE1 |
| Comparative Example 2 | 34.5 | | | 50 | | 15 | 0.5 | CE2 | 60 | 49 | 30 | 0.4 | 0.34 | 8.5 | CE2 |
| Comparative Example 3 | | 34.5 | | 50 | | 15 | 0.5 | EX4 | 147 | 20 | 9 | 4.5 | 0.26 | 8.5 | CE3 |
| Comparative Example 4 | | 34.5 | | 50 | | 15 | 0.5 | EX4 | 75 | 41 | 28 | 0.5 | 0.30 | 9.0 | CE4 |

TABLE 3-continued

Compounding Ratio and Wood Meal Composition of PP-compounded Examples and Comparative Examples

| | Mixing Ratio | | | | | | | | Wood Meal Composition | | | | |
|---|---|---|---|---|---|---|---|---|---|---|---|---|---|
| | PP | | | Wood Meal | | | | | Mean Fiber Length | Shortest Fiber Length (%) | Longest Fiber Length (%) | Bulk Density | Water Content |
| | | 84.50% | | | Resin/ Wood Meal Compounding Ratio | Talc | Reinforcing Agent | Remarks Example | | Target Values | | | |
| | OGPP | Recycled PP1 | Recycled PP2 | | | | | | μm 80 to 250 | μm ≤60 ≤30% | μm ≤30 ≤25% | 450 to 800 ≤5% | cm^3) 0.14 to 0.22 | (wt %) 5 to 10 | Remarks Example |
| Comparative Example 5 | | 34.5 | 50 | | | 15 | 0.5 | EX4 | 60 | 49 | 30 | 0.4 | 0.34 | 8.5 | CE5 |
| Comparative Example 6 | | 34.5 | 50 | | | 15 | 0.0 | CE6 | 147 | 20 | 9 | 4.5 | 0.26 | 8.5 | CE3 |
| Comparative Example 7 | | 34.5 | 50 | | | 15 | 0.0 | CE7 | 60 | 49 | 30 | 0.4 | 0.34 | 8.5 | CE5 |
| Comparative Example 8 | 63.4 | | | 21 | 75.0/25.0 | 15 | 0.5 | CE8 | 101 | 29 | 17 | 1.4 | 0.15 | 5.5 | EX1 |
| Comparative Example 9 | 21.1 | | 63.4 | 25.0/75.0 | 15 | 0.5 | CE9 | 101 | 29 | 17 | 1.4 | 0.15 | 5.5 | EX1 |

In the above descriptions, target value, for example, ≤60 μm: ≤30 under Shortest Fiber Length (wt %), means that fiber lengths of 60 μm or less account for 30 wt % or less. In addition, Longest Fiber Length may include fiber lengths of more than 800 μm.

TABLE 4

Compounding Ratio and Wood Meal Composition of PVC-compound Examples and Comparative Examples

| | Mixing Ratio (%) | | | | | | | Wood Mean Composition | | | | | |
|---|---|---|---|---|---|---|---|---|---|---|---|---|---|
| | PVC | | Wood Meal | | | | | Mean Fiber Length | Smallest Fiber Length (%) | Longest Fiber Length (%) | Bulk Density | Water Content | Remarks |
| | PVC + Wood Meal 83% | | | Resin/ Wood Meal Compounding Ratio | Calcium Carbonate | Heat Stabilizer | Lubricant | (μm) 8 to 250 | (μm) ≤60 ≤30% | (μm) ≤30 ≤25% | (μm) 450 to 800 ≤5% | (g/cm 3) 0.14 to 0.22 | (wt %) 5 to 10 |
| | PVC1 | PVC2 | | | | | | Target Values | | | | | |
| Example 5 | 20 | 15 | 48 | 42.2/57.8 | 15.00 | 1.00 | 1.00 | 101 | 29 | 17 | 1.4 | 0.15 | 5.5 | EX1 |
| Comparative Example 10 | 20 | 15 | 48 | 42.2/57.8 | 15.00 | 1.00 | 1.00 | 60 | 49 | 30 | 0.4 | 0.34 | 10.0 | CE5 |

Figure 5:
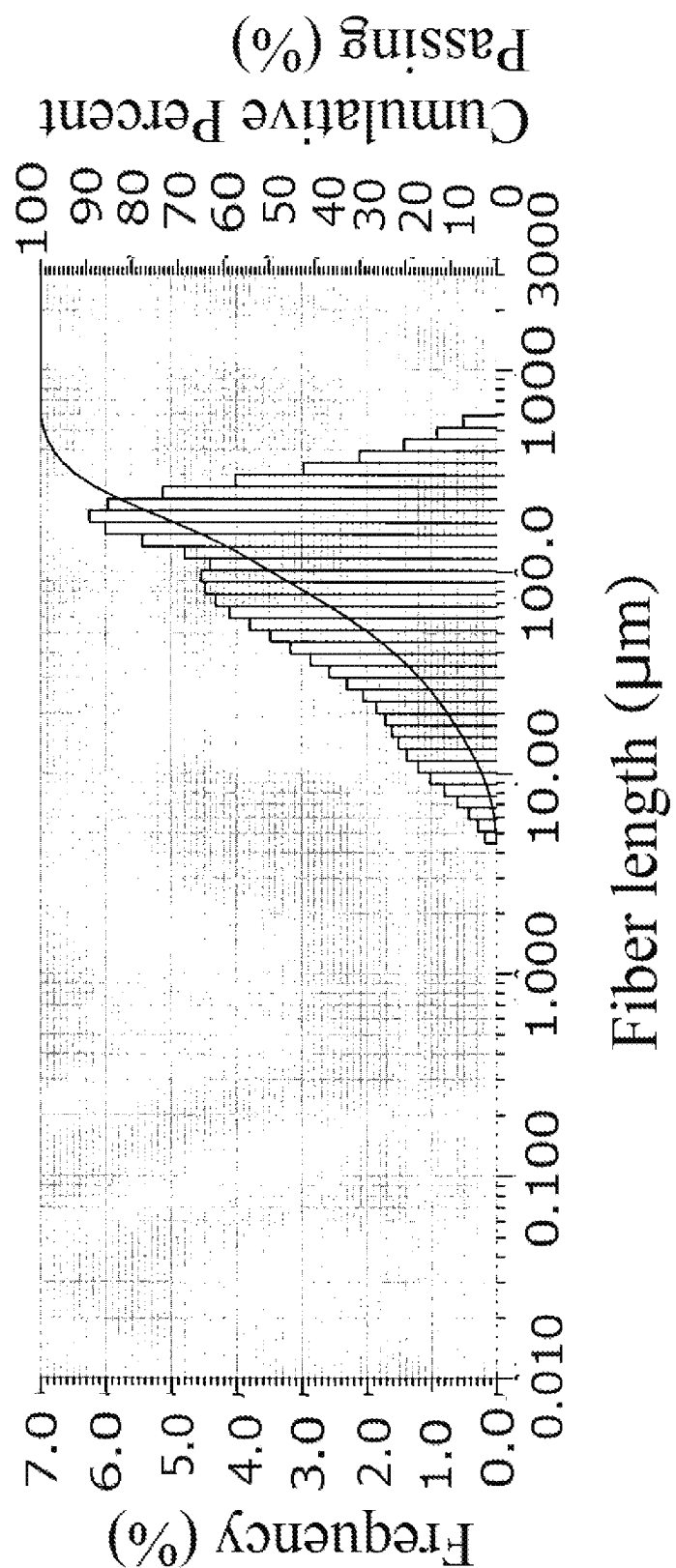
FIG. 5 is a graph showing a fiber length distribution of wood meal according to Example 1 of the present invention.
Figure 6:
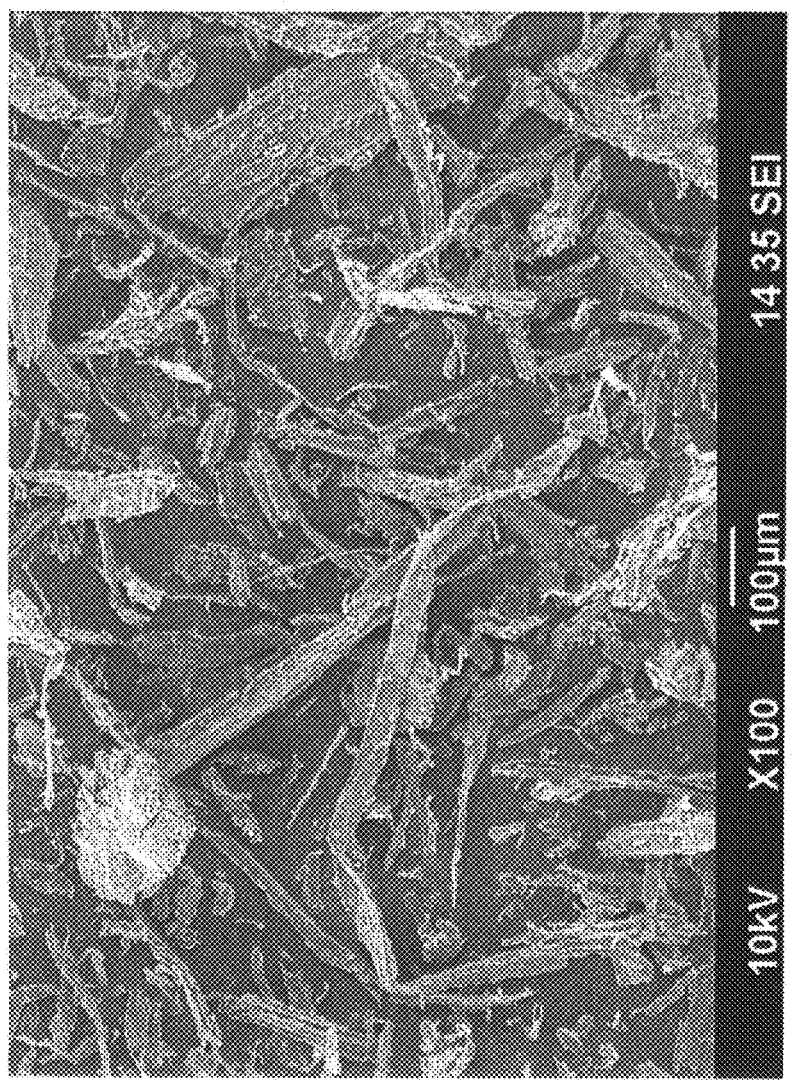
FIG. 6 is an SEM image of wood meal according to Example 4 of the present invention.
Figure 7:
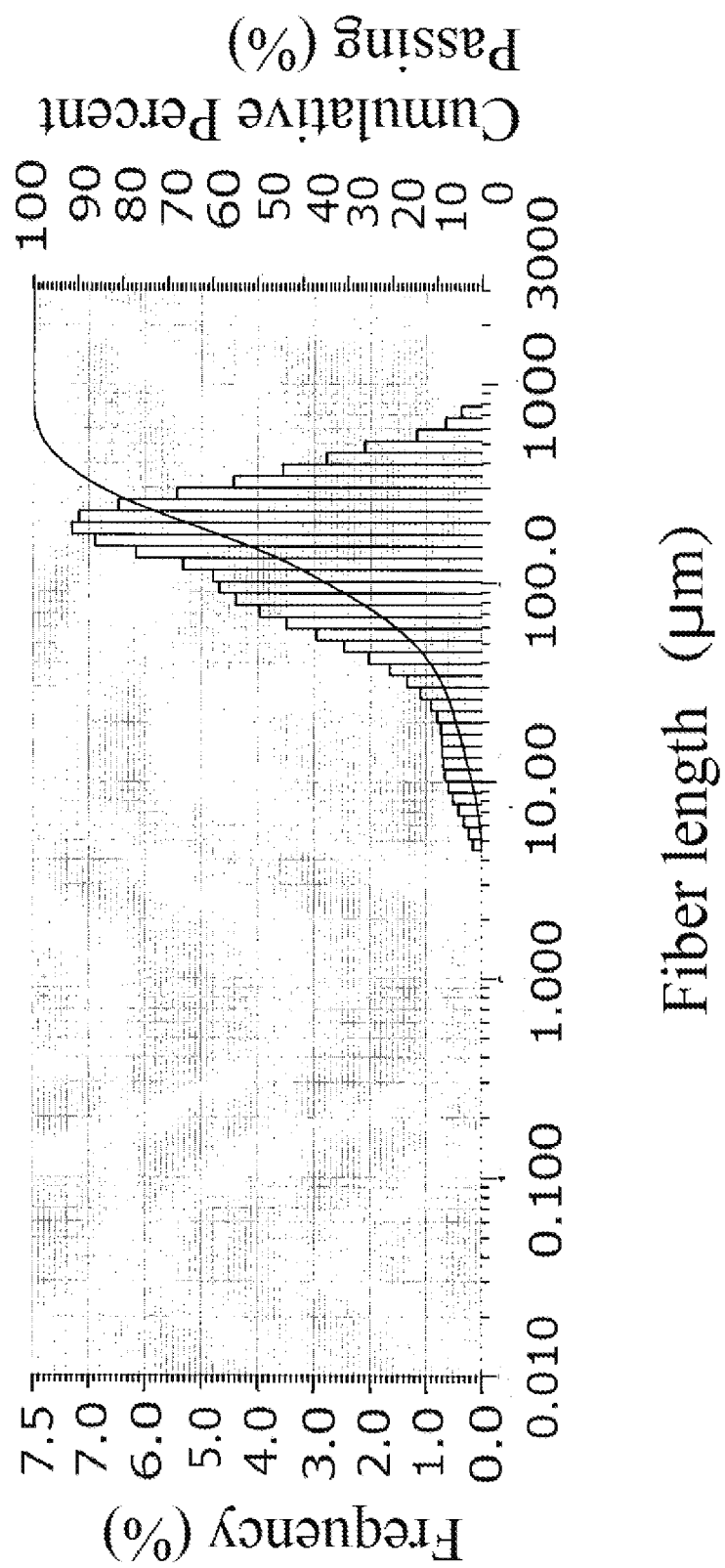
FIG. 7 is a graph showing a fiber length distribution of wood meal according to Example 4 of the present invention.
Figure 8:
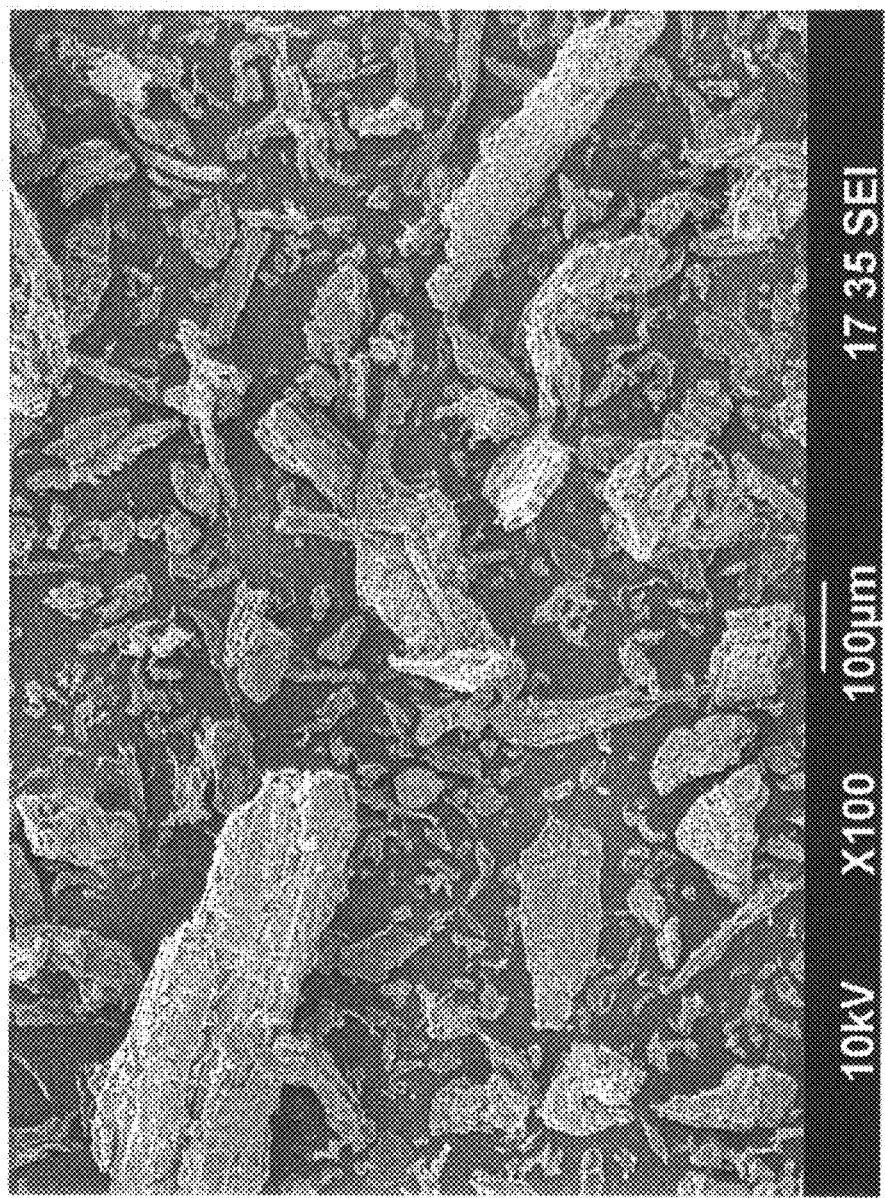
FIG. 8 is an SEM image of wood meal according to Comparative Example 3 of the present invention.
Figure 9:
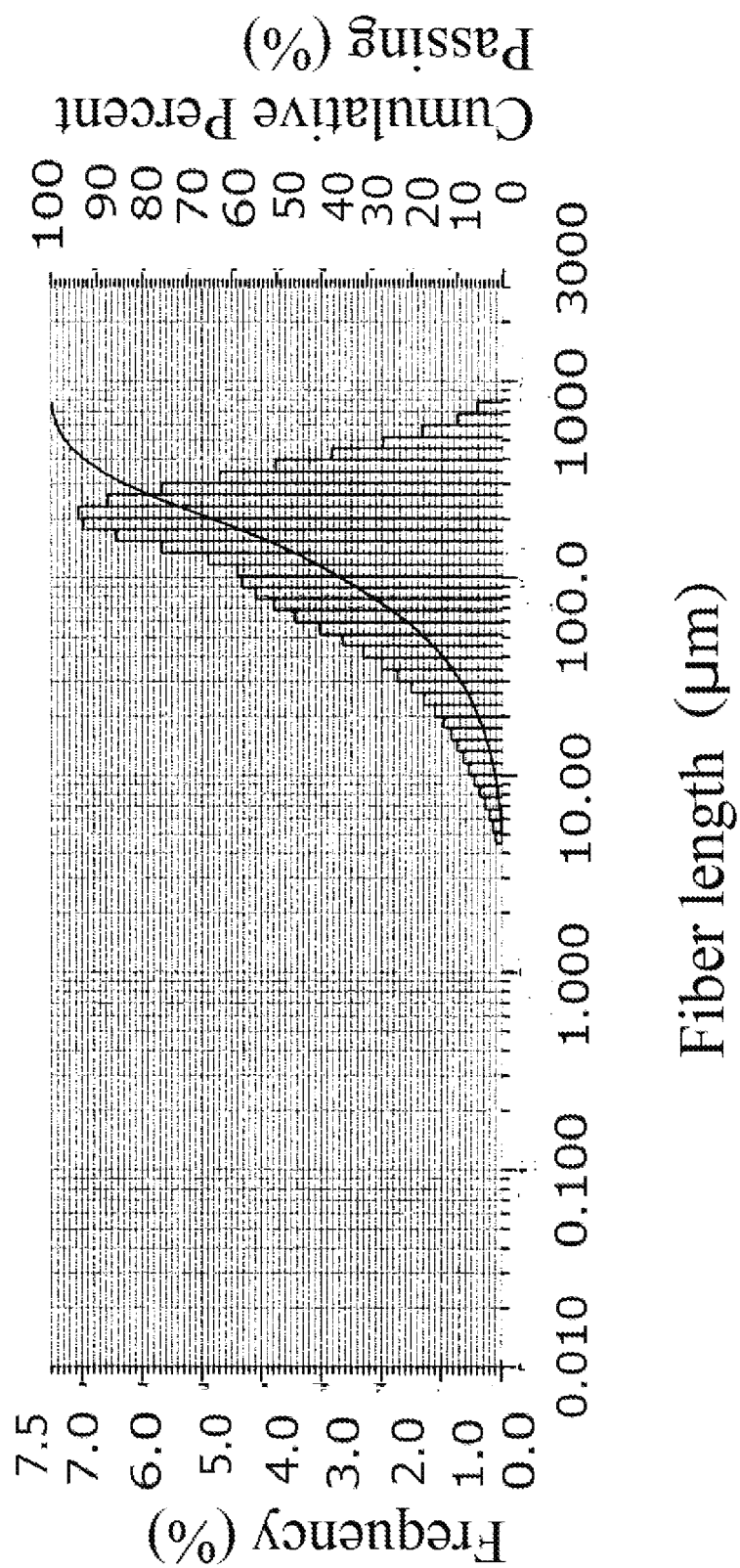
FIG. 9 is a graph showing a fiber length distribution of wood meal according to Comparative Example 3 of the present invention.

The longest and shortest fiber lengths are calculated from the fiber length distributions illustrated in FIGS. 5, 7, and 9.

Of Fiber lengths (μm)—Frequency (%)—Cumulative Percent Passing (%), the cumulative percent passing (%) represents the percentage of that fiber length or less relative to all sizes.

The bulk density, the fiber length distribution, and a method for measuring them are described below.

Method for Measuring the Bulk Density

While slightly shaking the delivery container, put powder into a measuring cylinder with a volume of 1 liter. At this time, care should be taken not to subject the measuring cylinder to vibration or impact force because to do so causes the powder to sink. After putting in the powder in an amount that exceeds the upper limit of the measuring cylinder, level off the powder, measure the weight M of the content, and calculate the bulk density ρb based on the following expression.

$$\rho b = M/1000 \ [g/cm^3]$$

Method for Measuring the fiber length Distribution

Analysis was entrusted to a public laboratory. The apparatus used for analysis was a Laser Diffraction Particle Size Analyzer LA-950V2 manufactured by HORIBA Ltd.

When the powder is classified into two groups with respect to certain fiber length, the fiber length is the median size if the larger group and smaller group contain the same amount of grains.

Data for Example 1 with the above-described testing apparatus will be listed below. For the other data, other tables will be cited, and details are omitted here.

Sample name: Example 1
Circulation speed: 7
Ultrasound: 01: 00 (5)
Stirring speed: 1
Transmittance (R): 69.1(%)
Transmittance (B): 74.6(%)
Fiber length reference: Volume
Refractive index (R): Wood meal [wood meal (1.630-0.000i), water (1.333)]
Refractive index (B): Wood meal [wood meal (1.630-0.000i), water (1.333)]
Substance name: Wood meal
Sample measurement No. of data acquisitions (LD): 5000
Sample measurement No. of data acquisitions (LED): 5000
No. of repetitions: 15
Median size: 101.04 (μm)
Average size: 130.51 (μm)
Mode size: 186.80 (μm)
Cumulative frequency % diameter: (2) 10.00(%)-18.91 (μm)
:(9) 90.00(%)-279.90 (μm)

Table 5 summarizes the above-described compound and other data.

generation of dioxin and poisonous hydrogen chloride gas which causes the incinerator to corrode can be suppressed.

The evaluation of the Examples and Comparative Examples can be considered in reference to measurement of the mechanical strengths or the like of obtained molded synthetic wood boards.

As disclosed in Japanese Unexamined Patent Application Publication No. Hei 7-266313, pellets as a synthetic wood meal composed of resin and wood meal are manufactured by
mixing PP or a mixed material of PP and PE or PVC with wood meal having a water content, a mean fiber length and a bulk density specified in each of the above-described examples at the mixing ratio specified in each of the Examples or Comparative Examples;
delivering the wood meal prepared as described above into flow-mixing and kneading means such as a Henschel mixer (750 liter) provided with a stirring and impacting blade for gelling and kneading with the help of friction heat;
drying the wood meal at 185° C. for about 15 minutes;
adding other additives such as resin and talc;
further stirring the wood meal at 185° C. and 300 to 900 rpm for about 15 minutes with the above-described stirring and impacting blade to gel and knead the wood meal with the help of friction heat;
cooling and granularizing this gelled and kneaded material using cooling and granularizing means provided with a stirring and crushing blade therein and an inlet and an outlet for cooling water on the jacket;
size-regulating this cooled and granularized wood meal into grains (formed into pellets) with a grain diameter of 10 mm or less using grain-sizing means such as a grinder; and
drying these grains at around 120° C. in a drier.

TABLE 5

Mixing Ratios and Employed Additives for Examples and Comparative Examples
Mixed Materials

| | | Raw Materials | (wt %) | Example No. | Comparative Example No. |
|---|---|---|---|---|---|
| Compound | Resin | PP OG-PP | 34.5 | Example 1 | Comparative Examples 8, 9 |
| | | | | Examples 2, 3 | Comparative Examples 1, 2 |
| | | | | Example 4 | Comparative Examples 3 to 7 |
| | | Recycled PP1 | 63.4(OGPP) | | Comparative Example 8 |
| | | Recycled PP2 | 21.1(OGPP) | | Comparative Example 9 |
| | PVC | PVC1 | 20 | Example 5 | Comparative Example 10 |
| | | PVC2 | 15 | Example 5 | Comparative Example 10 |
| | Wood Meal | | 50 | Examples 1 to 4 | Comparative Examples 1 to 7 |
| | (9 compositions) | | 48 | Example 5 | Comparative Example 10 |
| | Additives | Talc | 15 | Examples 1 to 4 | Comparative Examples 1 to 9 |
| | | Reinforcing Agent (Compatibilizer) | 0.5 | Examples 1 to 4 | Comparative Examples 1 to 5 |
| | | | 0 | | Comparative Examples 6, 7 |
| | | Calcium Carbonate | 15 | Example 5 | Comparative Example 10 |
| | | Heat Stabilizer | 1 | Example 5 | Comparative Example 10 |
| | | Lubricant | 1 | Example 5 | Comparative Example 10 |

As an additive, a reinforcing agent including a nonorganic filler, a flame retardant, an antioxidant, and an ultraviolet absorber can be used instead of those described above.

Of the reinforcing agents described above, calcium carbonate which is added to increase the mechanical strength, and calcium hydroxide which is added to increase the flame retardancy can bring about a more marked effect when added to PVC. In other words, although PVC used according to the present invention produces hydrogen chloride gas when heated, calcium carbonate and calcium hydroxide can chemically react with and capture this hydrogen chloride gas. More specifically, adding the above-described calcium carbonate or calcium hydroxide to PVC can prevent foaming due to hydrogen chloride gas during melt-knead processing and also, when synthetic wood using PVC according to the present invention is to be disposed of by incineration, the Thereafter, the grains are transferred to an extrusion apparatus as described later.

The pellets as the synthetic wood meal prepared as described above are supplied to the extrusion apparatus.

As disclosed in Japanese Unexamined Patent Application Publication No. 2011-62936, this extrusion apparatus includes: an extrusion die that introduces the extrusion material extruded by a screw extruder that melt-kneads and extrudes the molding material supplied via a constant feeder that supplies a molding material in a constant amount at a time; a molding die that forms the molding material that has passed through the extrusion die into a predetermined shape and then cool and harden the molding material; and a winder that collects the extrusion material (molded product) that has cooled and hardened after having passed through the molding dies.

The extruder can be any type of screw extruder including a biaxial screw extruder, a uniaxial screw extruder, a multiaxial screw extruder, or even a screw extruder with these types in combination.

The biaxial screw extruder is highly advantageous in dispersing the raw materials because of its features of high extrusion force due to the engagement structure of the screws and a specific kneading effect as described above. Furthermore, the biaxial screw extruder can prevent the temperature of materials from increasing due to friction because it is capable of producing a necessary extrusion force even with a low rotational frequency, making it easy to control the temperature of the materials with, for example, a heater (not shown in the figure) provided on the outer circumference of a barrel of the extruder. Therefore, for example, a biaxial conical screw extruder that rotates in the forward and backward directions at 10 rpm is preferably used.

Along its entire length, the barrel is divided into a plurality of zones including a feed zone, a plasticizing zone, a compression zone, a ventilation zone, and a metering zone for supplying the die with a predetermined amount of synthetic wood meal which is molten pellets in that order in the extrusion direction. No screw is provided between zones, and the temperature can be controlled individually for each zone using heating means.

The teeth of the screw in each of the zones are shaped so as to fulfill the function of that zone; for example, the pitches of screws differ for each zone.

According to the synthetic wood meal of the present invention, when the melt-kneaded material is oriented from a random turbulent flow into a laminar flow along the extrusion direction (M direction), it comes to have an enhanced bending strength, and the fibers oriented in the M direction suppress the expansion and contraction, thus decreasing the linear expansion coefficient. Then, when the material is collected by the winder, it passes through the molding dies provided with a core that forms a hollow portion is cooled while passing through the plurality of molding dies, and finally is formed into a synthetic wood board as shown in FIG. 1.

The temperatures in the extrusion die are 175° C. to 190° C. starting at the constant-feeder side, the rate of extrusion in the extrusion die is 50 kg/hr, and the temperatures in the molding dies are 175° C. to 190° C. A synthetic wood board as shown in FIG. 1 having a width of 145 mm and a thickness of 22 mm and provided with hollow portions at constant intervals is taken off by the winder at a rate of 20 m/hr.

Evaluation of the Examples and Comparative Examples

Figure 2:
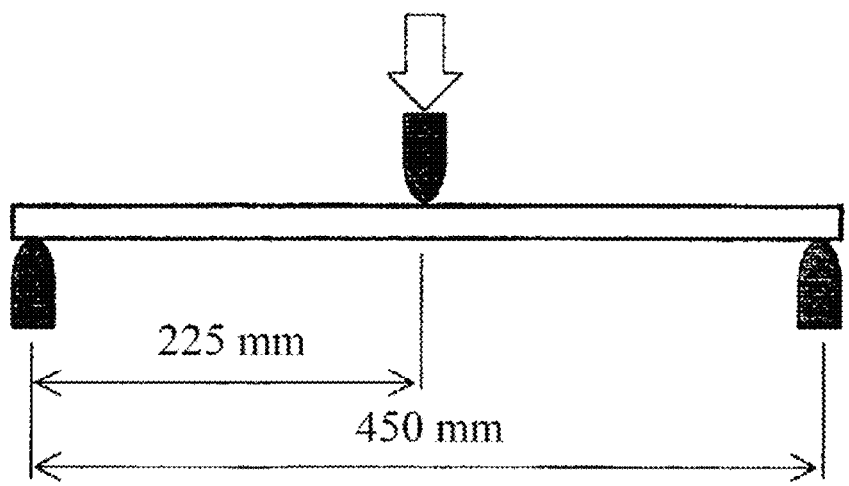
FIG. 2 is a schematic diagram showing a method for a bending strength test.

Based on the synthetic wood boards obtained as described above, the synthetic wood meal of the present invention is evaluated using the following measuring methods shown in FIG. 1 and FIG. 2.

Method for Measuring the Linear Expansion Coefficient

To measure the linear expansion coefficient α, a test piece that is produced by cutting into a length of 200 mm the hollow molded product shown in FIG. 1 having a width of 145 mm and a thickness of 22 mm and provided with hollow portions at constant intervals is used. After the test piece is left for 24 hours at −20° C., the length L-20 and the width T20 are measured with digital vernier calipers. Next, after the test piece is left for 24 hours at 40° C., the length L40 and the width T40 are measured. The linear expansion coefficient is calculated from these measurements based on Expression (1).

$$\alpha = (L_{40} - L_{-20}) / \{L_{-20} \times [40-(-20)]\} [1/°C.] \quad \text{(Expression 1)}$$

Linear Expansion Coefficient

The linear expansion coefficient should be $4.0 \times 10^{-5}$ [1/° C.]($4.0 \times 10^{-5}$ [m/m° C.]) or less. The reason is as follows. The deck members are prepared in a length of 1800 mm, with a joint (a gap between members adjacent to each other in the longitudinal (jointing) and width directions) of 5 mm. Assuming that the temperature of the members changes by 60° C., a linear expansion coefficient that prevents those joints from being eliminated is set. The linear expansion coefficient is in the M direction, i.e., the longitudinal direction.

Member Length (mm)×Linear Expansion Coefficient×Temperature Difference=Elongation $1800 \times 4.0 \times 10^{-5} \times 60 = 4.3$ mm Method of Bending Test With a distance of 450 mm between the support points, a bisecting 3-point bending test was carried out at a test rate of 10 mm/min. For the test piece, a hollow molded product (refer to FIG. 2) with a width of 145 mm, a thickness of 22 mm, and a length of 500 mm was used.

A load of 10 mm/min was applied to the center point, i.e., 225 mm of the distance of 450 mm between the support points (refer to FIG. 2; schematic diagram for bending test).

TABLE 6

Physical Properties of Synthetic Wood Board

Figure 3:
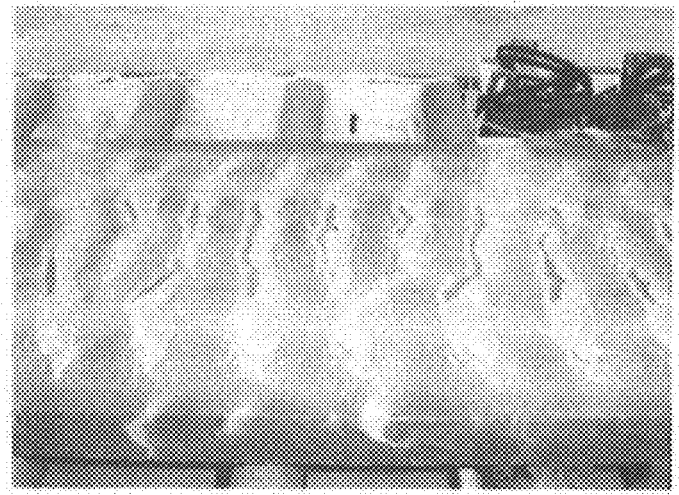
FIG. 3 is a perspective view of a melt fracture phenomenon.
Figure 4:
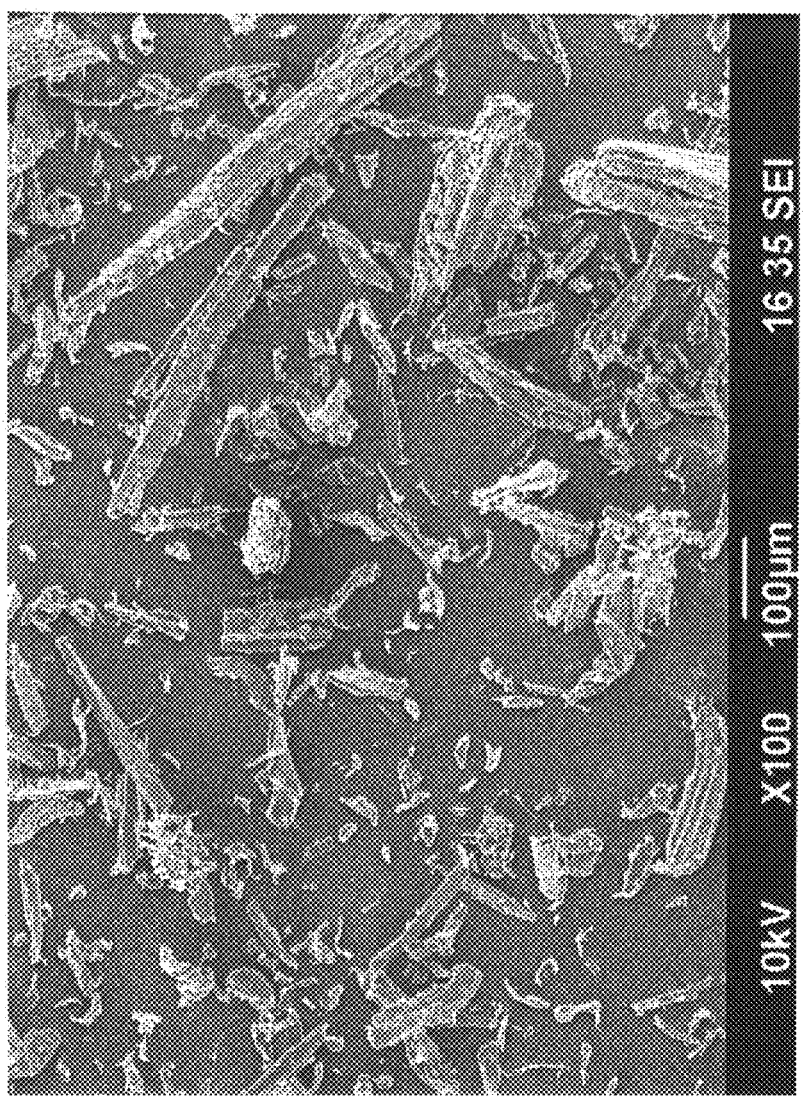
FIG. 4 is an SEM image of wood meal according to Example 1 of the present invention.

| | Beading Strength (MPa) | Bending Elastic Modulus (MPa) | Linear Expansion Coefficient [(×10^−5)° C.)] | | RMKS | |
| --- | --- | --- | --- | --- | --- | --- |
| | | | M direction | T direction | Resin | Wood Meal |
| Target Physical Properties | 25 <≈ 80 | 4000 <≈ 10,000 | 4.0 >≈ 0.15 | — | Resin | Wood Meal |
| Example 1 | 30 | 5900 | 2.3 | 4.0 | EX1 | EX1 |
| Example 2 | 31 | 6200 | 2.5 | 4.5 | EX2 | EX2 |
| Example 3 | 30 | 6000 | 2.8 | 4.7 | EX3 | EX3 |
| Example 4 | 30 | 5800 | 3.1 | 5.7 | EX4 | EX4 |
| Example 5 | 32 | 4300 | 3.0 | 5.0 | EX5 PVC compound | EX1 |
| Comparative Example 1 | Molding was not possible (Melt fracture phenomenon occurred; FIG. 3) | | | | CE1 | CE1 |

TABLE 6-continued

Physical Properties of Synthetic Wood Board

|  | Beading Strength (MPa) | Bending Elastic Modulus (MPa) | Linear Expansion Coefficient [($\times 10^{-5}$)° C.] | | RMKS | |
|---|---|---|---|---|---|---|
|  |  |  | M direction | T direction |  |  |
| Comparative Example 2 | 18 | 3000 | 5.8 | 5.2 | CE2 | CE2 |
| Comparative Example 3 | 23 | 4500 | 5.1 | 6.6 | EX4 | CE3 |
| Comparative Example 4 | 21 | 2900 | 5.7 | 6.2 | EX4 | CE4 |
| Comparative Example 5 | 29 | 2700 | 5.9 | 6.3 | EX4 | CE5 |
| Comparative Example 6 | 18 | 2700 | 5.8 | 6.2 | CE6 | CE3 |
| Comparative Example 7 | 17 | 2700 | 6.0 | 6.2 | CE7 | CE5 |
| Comparative Example 8 | 18 | 2800 | 6.0 | 6.5 | CE8 OGPP: 63.4 wt % | EX1 21.1 wt % |
| Comparative Example 9 | 22 | 4500 | 2.5 | 5.0 | CE9 OGPP: 21.1 wt % | EX1 63.4 wt % |
| Comparative Example 10 | 20 | 2500 | 5.5 | 6.5 | EX5 PVC compound | CE5 |

For M direction and T direction, see Table 2

Example 5 and Comparative Example 10 are intended to compare physical properties of PVC-compounded synthetic wood boards (physical properties depending on difference of wood meal compositions) (refer to Table 6).

Comparative Examples 8 and 9 are intended to compare physical properties and to serve as Comparative Examples having compounding ratios between wood meal and resin that deviate from the range according to the present invention.

EX1 to EX5 under the columns Resin and Wood Meal refer to the resin of Examples 1 to 5, and CE1 to CE10 refer to the wood meal of Comparative Examples 1 to 10. For example, the resin and wood meal of Comparative Example 10 are the same as the resin of Example 5 and the wood meal of Comparative Example 5 respectively.

With reference to Tables 1 to 6 described above, particularly to Tables 3, 4, and 6, because the mean fiber length, the two shortest fiber lengths, and the bulk density of Comparative Examples 1, 2, 4, 5, and 7 do not fall within the ranges of the present invention, the bending strength, the bending elastic modulus, and the linear expansion coefficient (M direction) deviate from the target values. Because the bulk densities of Comparative Examples 3 and 6 deviate from the above-described range, the bending strength and the linear expansion coefficient (M direction) do not meet the target values, though the bending elastic modulus of Comparative Example 3 meets the target value.

The bulk densities greatly deviate from the target value probably because rotted or deteriorating wood pieces or other plants such as dead leaves were mixed. The results clearly show that the strength is not enhanced.

FIG. 3 shows a melt fracture phenomenon from Comparative Example 1 in which large, discontinued cracks (nests) can be seen on the surface of the molded product. This occurs because parallel streamlines of wood meal are not formed in the extruder and hence intense and weak stresses periodically occur in the molten resin, accordingly fluidity of the molten synthetic wood meal is extremely low.

Although employing the same mixing ratio as in Example 4, Comparative Examples 3 to 5 exhibit physical properties significantly different from those of Example 4 because of different wood meal compositions.

Although Comparative Examples 8 and 9 have wood meal compositions falling within the ranges according to the present invention (same composition as in Example 1), the compounding ratios between the wood meal and the resin deviate from the range according to the present invention. The bending elastic modulus, the bending strength, and the linear expansion coefficient (M direction) of Comparative Example 8 do not satisfy their respective target values, though the bending elastic modulus of Comparative Example 9 satisfies the target value.

In PVC-compounded Comparative Example 10, only the mean fiber length deviates from the range according to the present invention. Nevertheless, the bending strength, the bending elastic modulus, and the linear expansion coefficient (M direction) do not satisfy the target values.

On the other hand, PVC-compounded Example 5 and Comparative Example 10 have the same compounding ratio among PVC, wood meal, and additives, and only the mean fiber length which is one of the wood meal properties differs in terms of whether it falls within or deviates from the range according to the present invention. Nevertheless, the bending strength, bending elastic modulus, and linear expansion coefficient (M direction) differ greatly.

In more detail, if the fibers of the wood meal take the form of fine powder, in other words, if the shortest fiber length accounts for a large proportion, the material is not oriented into a laminar flow along the extrusion direction (M direction). Because of this, neither the mechanical strength nor the linear expansion coefficient is improved (refer to Comparative Example 1 and FIG. 3). When the bulk density is too small to fall within the range according to the present invention, it is presumed that a large amount of fine powder is distributed and that more wood meal with the shortest fiber length is distributed. However, wood meal with a large bulk density can also exist as seen in Comparative Examples 2 to 4.

The compatibilizer composed of a modified olefin compound of PP in Table 1 is not added because it does not compatibilize (react) with vinyl chloride, though it reacts with wood meal. As described below, Example 5 and Comparative Example 10 brought about different effects probably because of difference of lengths of contained fibers.

Furthermore, if the fiber lengths fall within the ranges of the claims, it is presumed that the effect of the compatibilizer does not change because in a case that the wood meal does not have a bulk density reaching to the target value thereof, eventually the wood meal does not have the mean fiber length reaching to the target value thereof. In addition, because the lubricant just works to improve the molding process of vinyl chloride, it has nothing to do with the compatibilizing effect for linking resin and wood meal. Because PVC is not crystalline resin, it more easily adheres to wood meal than PP does when molten, and also because PVC has highly electronegative chlorine atoms in the side chain, it contacts with the wood surface more easily than non-polar PP does. This is probably the reason why PVC comes to have an enhanced tensile strength even without a compatibilizer. On the other hand, this causes PVC to have decreased hardness (not crystallized), probably leading to a lower bending elastic modulus. It is also found from Example 5 and Comparative Example 10 that the linear expansion coefficient is affected by the fiber length.

Compatibilizers that can be used for PVC include a modified PVC copolymer that is synthesized from VCL (vinyl chloride), VA (vinyl acetate), and a modifying agent. As the above-described modifying agent, maleic anhydride, monomethyl maleate, allyl glycidyl ether, or PMMA (polymethyl methacrylate) can be used.

Of these modifying agents, particularly a modified PVC copolymer using allyl glycidyl ether having an epoxy group as a reactive functional group brings about a marked effect. In more detail, as described above, although PVC is somewhat thermally unstable so as to generate hydrogen chloride gas when heated, an epoxy compound which reacts with and captures this hydrogen chloride gas works as a stabilizer (for preventing foaming due to hydrogen chloride gas) while PVC is being melted. Furthermore, when synthetic wood using PVC according to the present invention is to be disposed of by incineration, the epoxy compound is capable of preventing the generation of dioxin and a poisonous hydrogen chloride gas which causes the incinerator to corrode.

In consideration of the above-described linear expansion coefficient being affected by the fiber length, the linear expansion coefficient in the T direction is set at $11 \times 10^{-5}$ [1/° C.]($11 \times 10^{-5}$ [m/m° C.]) or less as one example. The reason is as follows. Deck members are prepared in a width of 145 mm with a joint (a gap between members adjacent to each other in the longitudinal (jointing) and width directions) of 5 mm. As disclosed in Japanese Unexamined Patent Application Publication No. 2008-285929, clips for securing the deck members to joists are disposed in the joints in the width direction. These clips have a V-shaped projection which is deformed into an I shape to allow the clips to be elongated by a maximum of 1 mm in the width direction. Assuming that the temperature of the members changes by 60° C., the linear expansion coefficient is set so that the elongation in the width direction does not exceed 1 mm. The above-described linear expansion coefficient is in the T direction, i.e., the width direction.

Member Length (mm)×Linear Expansion Coefficient×Temperature Difference=Elongation $145 \times 11 \times 10^{-5} \times 60$(° C.)=0.957 mm

The invention claimed is:

1. A synthetic wood meal for a pellet used for extrusion molding of a molded wood product comprising:
    30 wt % to less than 45 wt % of a thermoplastic resin including polypropylene (PP) or a mixed material of polypropylene (PP) and polyethylene (PE) with the melt index of 2 to 5 g/10 minutes;
    50 wt % to 35 wt % of a wood meal having a bulk density of 0.15 to 0.21 g/cm$^3$ and a mean fiber length of 101 to 189 μm in which 19 to 29% or less of the wood meal having a shortest fiber length of 60 μm or less, and 9 to 20% or less of the wood meal having a shortest fiber length of 30 μm or less; and
    an additive including a reinforcing agent.

2. The synthetic wood meal according to claim 1, wherein 5 wt % or less of the wood meal has a longest fiber length of 450 μm to 800 μm.

3. The synthetic wood meal according to claim 1, wherein the water content of the wood meal is 5 to 10 wt %.

4. The synthetic wood meal according to claim 1, wherein the compounding ratio of the wood meal to the thermoplastic resin including polypropylene or a mixed material of polypropylene and polyethylene is 50 wt % of wood meal to 34.5 wt % of thermoplastic resin, and the remainder includes the reinforcing agent as the additive.

5. The synthetic wood meal according to claim 4, wherein the polypropylene is off-grade PP or a recycled PP1 which is a resin collected in accordance with the Containers/Packaging Recycling Act and contains polypropylene (PP) and polyethylene (PE) in a ratio of PP:PE is approximately 1:1 by DSC (differential scanning calorimetry) analysis or recycled PP2 containing the recycled PP1 and off-grade PP in a ratio of 1:1 and such that the content of PE is approximately 25 wt % of the PP2.

6. The synthetic wood meal according to claim 1, wherein the additive includes a compatibilizer as the reinforcing agent.

7. The synthetic wood meal according to claim 6, wherein the compatibilizer is maleic anhydride modified olefin compound.

* * * * *

UNITED STATES PATENT AND TRADEMARK OFFICE
CERTIFICATE OF CORRECTION

PATENT NO. : 9,505,932 B2  Page 1 of 1
APPLICATION NO. : 14/366718
DATED : November 29, 2016
INVENTOR(S) : Kikuchi et al.

It is certified that error appears in the above-identified patent and that said Letters Patent is hereby corrected as shown below:

On the Title Page

Item (71) titled Applicant, please delete "WPC CORPORATION" and insert --BEIJING SHENGSHENG CULTURE LIMITED LIABILITY COMPANY--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*